April 21, 1970　　　F. C. NEWMAN　　　3,507,915
PRODUCTION OF UNSATURATED ALIPHATIC ACIDS
Filed May 26, 1964
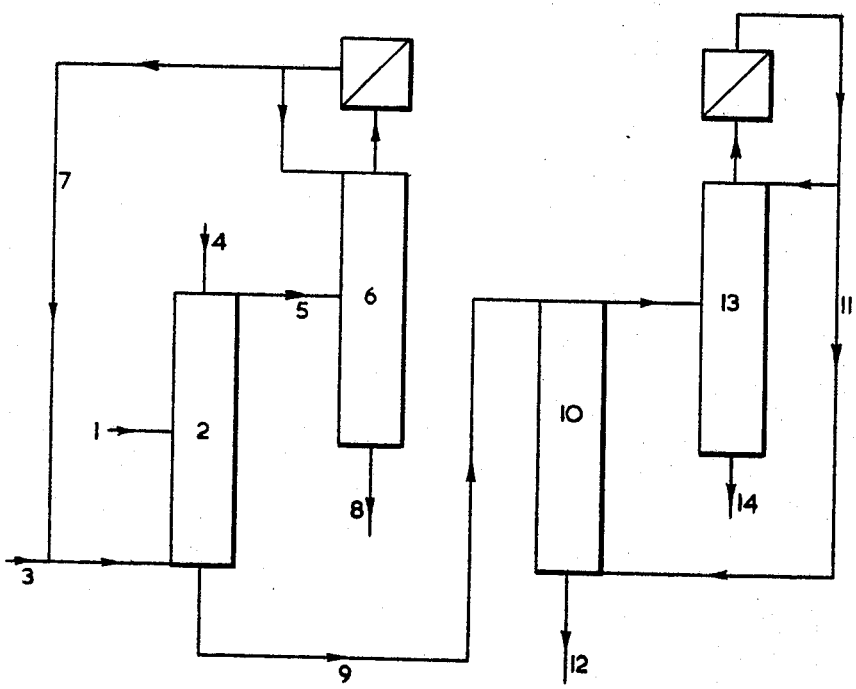
INVENTOR
FRANK CHRISTOPHER NEWMAN
BY
Ward, Haselton, McElhannon, Orme, Brooks, Fitzpatrick
ATTORNEYS

United States Patent Office 3,507,915
Patented Apr. 21, 1970

3,507,915
PRODUCTION OF UNSATURATED
ALIPHATIC ACIDS
Frank Christopher Newman, Great Bookham, Surrey,
England, assignor to The Distillers Company Limited,
Edinburgh, Scotland, a British company
Filed May 26, 1964, Ser. No. 370,318
Claims priority, application Great Britain, June 20, 1963,
24,512/63
Int. Cl. C07c 57/04
U.S. Cl. 260—526          6 Claims

ABSTRACT OF THE DISCLOSURE

A process for the recovery of pure acrylic acid from an aqueous mixture of acrylic and acetic acids comprising extracting the aqueous mixed acids with a selective solvent for acrylic acid, washing the resultant solvent phase containing the mixed acids with water or with an aqueous solution of an inorganic salt, and fractionally distilling the washed solvent phase to recover substantially pure acrylic acid.

---

The present invention relates to a process for the production of pure unsaturated acids and in particular to a process for the production of pure acrylic acid.

Processes for the production of acrylic acid by the vapour phase catalytic oxidation of propylene are known. In such processes the effluent gases from the reactor containing acrylic acid, and in addition acetic acid as one of the major by-products, are cooled resulting in an aqueous solution of acrylic and acetic acids. Hitherto the recovery of pure acrylic acid from an aqueous mixture of acids has proved impossible.

It is an object of the present invention to provide a process for the recovery of substantially pure acrylic acid, substantially free from acetic acid, from aqueous mixtures of acrylic and acetic acids.

According to the present invention a process for the production of pure acrylic acid from an aqueous mixture of acrylic and acetic acids comprises extracting the aqueous mixed acids with a selective solvent for acrylic acid, washing the resultant solvent phase containing the mixed acids with water or with an aqueous solution of an inorganic salt, and fractionally distilling the washed solvent phase to recover the solvent as an overhead fraction and pure acrylic acid, substantially free from acetic acid, as a base product.

The selective solvent for acrylic acid is preferably an organic solvent and may be for example ethyl acetate or preferably ethyl acrylate. The process is not limited to the use of these solvents however and other suitable esters, higher alcohols, ketones or hydrocarbons may be employed. The proportion of selective solvent to the aqueous acid mixture may vary within moderately wide limits depending on the solvent in question. In general it is suitable to use approximately equal volumes of solvent and aqueous mixture.

Likewise the proportion of water or aqueous inorganic salt used may vary within moderately wide limits which again will depend to a large extent on the selective solvent chosen. A suitable inorganic salt comprises ammonium sulphate.

The process of the present invention may be carried out in a number of different ways. For example the extraction and the water washing of the resultant solution may be carried out using a counter-current system in a single tower, the aqueous mixture of acids being introduced as an intermediate point, the selective solvent near the base, and water near the top of the tower. The final washed solvent phase may be removed from the top of the tower and passed to a distillation column for the recovery of the pure acrylic acid. The aqueous solution containing substantially all of the acetic acid together with some acrylic acid is removed from the base of the tower. This solution may itself be extracted with a solvent e.g. ethyl acetate, the solvent phase being distilled to remove the solvent and recover a dry acetic and acid/acrylic acid mixture. This latter dry mixture of acids may be subjected to further treatment for example as described in our co-pending application No. 24,511/63 for recovery of pure acrylic acid.

The process of the present invention is further illustrated with reference to the accompanying drawing in the form of a flow design.

An aqueous mixture of acrylic and acetic acids is fed by line 1 to an intermediate point in an extraction/washing column 2 where it is extracted counter-currently with a suitable solvent e.g. ethyl acrylate fed in through line 3. The solvent/acid solution ascends the column to be washed counter-currently in the upper portion with water introduced through line 4. The washed solvent stream leaving the head of column 2 is passed by line 5 to a fractionating still 6 where the solvent is stripped from solution and passes overhead through a phase separator for removal of water and recycle line 7 to the base of column 2. From the base of still 6 pure acrylic acid, substantially free from acetic acid is recovered as product through line 8. The aqueous solution of mixed acids leaving the base of column 2 is fed by line 9 to the head of a second extraction column 10 where the acids are extracted by counter-current flow into solution in a suitable solvent e.g. ethyl acetate, fed to the base of the column through line 11. Residual aqueous solution is discharged to waste through line 12. The solvent/acid solution is removed from the head of column 10 and fed to an intermediate point in a still 13 which serves to strip the solvent leaving a dry mixture of acrylic and acetic acids as base product leaving through line 14. This dry mixtures of acids may be further processed as described above for recovery of glacial acrylic acid. Stripped solvent removed from the head of column 13 is passed to a phase separator for removal of water and then recycled through line 11 to the base of column 10.

The process of the present invention is illustrated further with reference to the following example.

EXAMPLE

To the base of a 1 in I.D., 35 plate rotating disc extraction column was fed ethyl acrylate at the rate of 250 ml./hr. To plate No. 10 above the base was fed an aqueous acid solution composed of acrylic acid, 17.0% w./w. and acetic acid, 4.4% w./w. at the rate of 500 ml./hr. Water (250 ml./hr.) was fed to the head of the column; the oil extract (265 g./hr.) had the following analysis; ethyl acetate, 0.1% w./w.; ethyl acrylate 71.2% w./w.; acetic acid, trace; acrylic acid, 22.9% w./w.; water, 5.8% w./w. The raffinate (735 g./hr.) contained acrylic acid, 7.1% w./w.; acetic acid, 2.6% w./w.; ethyl acrylate, 2.0% w./w. The acrylic acid recovery in the oil phase was 54% of that fed to the column.

After stripping the oil phase in a still (56 in. x 2 in. 5 mm. Fenske helices) the base product analysed as: acrylic acid, 99.4% w./w.; acetic acid, 0.3% w./w.; 0.16% w./w.; esters, trace.

I claim:
1. A process for the separation of acrylic acid from an aqueous mixture of acrylic acid and acetic acid which comprises extracting the aqueous mixed acids with a lower alkyl ester of a saturated or unsaturated lower aliphatic acid selective solvent for acrylic acid, washing the resultant solvent with water or an aqueous solution of an inorganic salt, and fractionally distilling the washed solvent phase to recover the solvent as an overhead fraction and substantially pure acrylic acid substantially free from acetic acid as a base product.

2. A process as claimed in claim 1 wherein the selective solvent is ethyl acetate.

3. A process as claimed in claim 1 wherein the selective solvent is ethyl acrylate.

4. A process as claimed in claim 1 wherein the proportion of selective solvent employed is equal in volume to the volume of the aqueous mixture.

5. A process as claimed in claim 1 wherein the inorganic salt comprises ammonium sulphate.

6. A process as claimed in claim 1 wherein the extraction and washing of the resultant solvent phase is carried out using a countercurrent system in a single tower, the aqueous mixture of acids being introduced at an intermediate point, the selective solvent near the base, and the water at the top of the tower.

References Cited
UNITED STATES PATENTS

| | | | |
|---|---|---|---|
| 3,344,178 | 9/1967 | Brown et al. | 260—526 |
| 1,915,002 | 6/1933 | Ricard et al. | 260—526 |

LORRAINE A. WEINBERGER, Primary Examiner

P. J. KILLOS, Assistant Examiner

U.S. Cl. X.R.

260—541